United States Patent
Park et al.

(10) Patent No.: US 9,465,314 B2
(45) Date of Patent: Oct. 11, 2016

(54) LIGHT SCANNING UNIT AND IMAGE FORMING APPARATUS EMPLOYING THE SAME

(71) Applicant: Samsung Electronics Co., Ltd., Suwon-si (KR)

(72) Inventors: Chul-hyun Park, Yongin-si (KR); Han-sung Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/045,856

(22) Filed: Feb. 17, 2016

(65) Prior Publication Data

US 2016/0161882 A1 Jun. 9, 2016

Related U.S. Application Data

(62) Division of application No. 14/307,885, filed on Jun. 18, 2014, now Pat. No. 9,296,221.

(60) Provisional application No. 61/892,039, filed on Oct. 17, 2013.

(30) Foreign Application Priority Data

Oct. 21, 2013 (KR) .................. 10-2013-0125550

(51) Int. Cl.
  *B41J 2/325* (2006.01)
  *G03G 15/043* (2006.01)
  (Continued)

(52) U.S. Cl.
  CPC ............. *G03G 15/043* (2013.01); *B41J 2/447* (2013.01); *B41J 2/471* (2013.01); *B41J 2/473* (2013.01); *G02B 26/10* (2013.01); *G02B 26/123* (2013.01); *G02B 26/124* (2013.01)

(58) Field of Classification Search
  CPC .......... B41J 2/471; B41J 2/447; B41J 2/473; H04N 1/203; G03D 13/002; G03G 15/043; G02B 26/10; G02B 26/123; G02B 26/124
  See application file for complete search history.

(56) References Cited

U.S. PATENT DOCUMENTS 5,982,410 A * 11/1999 Frick ................. H04N 1/203
                                                    347/218
7,167,192 B2 * 1/2007 Ohta ................. G03D 13/002
                                                    347/139

(Continued)

FOREIGN PATENT DOCUMENTS

JP    2008-076586    4/2008
JP    2009-251308    10/2009

(Continued)

OTHER PUBLICATIONS

International Search Report and Written Opinion of the International Searching Authority issued Nov. 11, 2014 in International Patent Application PCT/KR2014/005776.

(Continued)

*Primary Examiner* — Kristal Feggins
(74) *Attorney, Agent, or Firm* — Staas & Halsey LLP

(57) ABSTRACT

A light scanning unit includes a light source unit emitting a light beam according to an image signal, a light deflector scanning the light beam that is deflectively emitted by the light source unit, a housing having a side portion where the light source unit is provided and a base surface on which the light deflector is provided, and a deformation prevention member connecting opposite sides of the housing across an upper side of the base surface. The light scanning unit is employed by an image forming apparatus.

20 Claims, 15 Drawing Sheets

(51) Int. Cl.
    *B41J 2/47*           (2006.01)
    *B41J 2/447*         (2006.01)
    *G02B 26/12*        (2006.01)
    *G02B 26/10*        (2006.01)

(56) References Cited

U.S. PATENT DOCUMENTS

| | | | |
|---|---|---|---|
| 8,390,660 B2 * | 3/2013 | Ogasahara | G03G 15/0435 347/224 |
| 8,478,141 B2 | 7/2013 | Naruse | |
| 2010/0046046 A1 | 2/2010 | Tomioka | |
| 2011/0298882 A1 | 12/2011 | Otana et al. | |
| 2012/0044316 A1 | 2/2012 | Amada et al. | |
| 2012/0062685 A1 | 3/2012 | Serizawa et al. | |
| 2013/0135423 A1 | 5/2013 | Imai | |
| 2013/0162745 A1 | 6/2013 | Okada | |
| 2013/0258421 A1 | 10/2013 | Nakaie | |

FOREIGN PATENT DOCUMENTS

| | | |
|---|---|---|
| JP | 2012-108383 | 6/2012 |
| JP | 2013-134274 | 7/2013 |
| JP | 2013-207613 | 10/2013 |

OTHER PUBLICATIONS

Extended European Search Report dated Feb. 25, 2015 in European Patent Application No. 14180311.4.
US Restriction Requirement issued Jan. 26, 2015 in U.S. Appl. No. 14/307,885.
US Office Action issued Jul. 16, 2015 in U.S. Appl. No. 14/307,885.
US Notice of Allowance issued Nov. 17, 2015 in U.S. Appl. No. 14/307,885.
US Corrected Notice of Allowance issued Dec. 17, 2015 in U.S. Appl. No. 14/307,885.
U.S. Appl. No. 14/307,885, filed Jun. 18, 2014, Chul-hyun Park, et al., Samsung Electronics Co., Ltd.

* cited by examiner

LIGHT SCANNING UNIT AND IMAGE FORMING APPARATUS EMPLOYING THE SAME

CROSS-REFERENCE TO RELATED APPLICATIONS

This application is a divisional of U.S. patent application Ser. No. 14/307,885, filed on Jun. 18, 2014, which claims the priority benefit of Provisional U.S. Patent Application No. 61/892,039, filed on Oct. 17, 2013, and Korean Patent Application No. 10-2013-0125550, filed on Oct. 21, 2013, in the Korean Intellectual Property Office, the disclosures of which are incorporated herein in their entirety by reference.

BACKGROUND

1. Field

One or more embodiments relate to a light scanning unit and an image forming apparatus employing the same, and more particularly, to a light scanning unit for reflecting and deflecting luminous flux output from a light source toward a light deflector to form an image on a surface to be scanned, and an image forming apparatus employing the same and performing an electrophotographic process.

2. Description of the Related Art

Electrophotographic image forming apparatuses such as laser printers, digital copiers, multifunction printers (MFPs), etc. have a structure in which light is scanned onto a photosensitive body by using a light scanning unit to form an electrostatic latent image, a formed electrostatic latent image is developed into a developed image by using a developer such as toner, and the developed image is transferred onto a printing medium.

The light scanning unit generally uses plastic resin as a material for a housing for mounting optical parts such as a light source or a light deflector. However, the housing formed of a plastic resin material has a problem in that parts of the housing may be thermally deformed according to a change in peripheral and internal temperatures and a position of the photosensitive body where an image is formed by a light beam may be deviated.

The tendency for a change in the image forming position on the photosensitive body due to the thermal deformation may be stronger in the light scanning unit for scanning a plurality of light beams such as a color image forming apparatus. In a color image forming apparatus of the related art in which a plurality of luminous fluxes are scanned by using one light deflector, in order to guide the luminous flux after scanning to each photosensitive body corresponding to a different color, the luminous fluxes are obliquely incident with respect to a plane that is perpendicular to a rotational shaft of a deflection unit and then the luminous fluxes are split. An oblique incident type light scanning unit is a structure of reducing material costs by making a compact optical path layout and reducing the number of parts. In the color image forming apparatus of the related art, to address the thermal deformation problem, changing tendencies of the image forming positions on the photosensitive body, which occurs due to heating of light sources and a change in the peripheral temperature, may be congruent to each other by fixing flanges in which light sources are assembled on the housing by using elastic members and varying pressing-directions of the elastic members in which the elastic members are assembled according to the flanges.

However, for a light scanning unit in which a distance between a plurality of light sources is narrow, for example, less than or equal to 12 mm, it is difficult to separately accommodate a holder (flange) for each light source and to make a space for assembling the elastic members on the holder (flange). Also, as the elastic members are assembled for each light source, the number of parts and the number of steps are increased so that the material costs are increased and a process is complicated.

SUMMARY

In an aspect of one or more embodiments, there is provided a light scanning unit which reduces a change in image forming positions of a plurality of light sources, and an image forming apparatus employing the same.

In an aspect of one or more embodiments, there is provided a light scanning unit includes a light source to emit a light beam according to an image signal, a light deflector deflectively scanning the light beam that is emitted by the light source, a housing having a first side wall where the light source is provided and a base surface on which the light deflector is provided, and a deformation prevention member to connect opposite sides of the housing across an upper side of the base surface.

The deformation prevention member may be formed of a material having a thermal expansion coefficient that is lower than that of a material of the housing.

The housing may be formed of plastic resin and the deformation prevention member is formed of metal or plastic resin.

The housing may include a second side wall arranged facing the first side wall with the light deflector interposed between the first and second side walls, and the deformation prevention member may connect the first and second side walls.

A portion of the deformation prevention member that is connected to the first side wall is an area where the light source may be provided or an area adjacent to the area where the light source may be provided.

The deformation prevention member may have a form of a long bar or a plate.

One or a plurality of the deformation prevention members may be provided

The deformation prevention member may be disposed to be higher than an installation height of a light source of the light source.

The deformation prevention member may have a strength reinforcement structure.

The strength reinforcement structure may include at least one of a bent portion on a cross-sectional surface of the deformation prevention member, an embossment formed on a surface of the deformation prevention member, and a rib provided on a surface of the deformation prevention member.

The housing may further include a cover disposed above the deformation prevention member and the cover may include a heat dissipation hole provided adjacent to a position where the deformation prevention member is disposed.

The light source may include a plurality of light sources and the plurality of light sources are arranged at one side wall of the housing.

The light source may further include an integrated light source holder that fixes the plurality of light sources to the housing.

The light source holder may be integrally formed with the housing.

The light source may further include a circuit board where the plurality of light sources are mounted.

Light beams emitted by the plurality of light sources may be obliquely incident on the light deflector with respect to a sub-scanning direction.

The light source may include first to fourth light sources that emit first to fourth light beams, and the light deflector may deflectively scan the first and second light beams on one deflection surface and the third and fourth light beams on a deflection surface that is different from the one deflection surface.

The light scanning unit may further include an incident optical system that is arranged between the light source and the light deflector.

The incident optical system may include at least one of a collimator lens that shapes a light beam emitted by the light source into a parallel luminous flux and a cylindrical lens that focuses the light beam, which is emitted by the light source, on a deflection surface of the light deflector in a sub-scanning direction.

The light scanning unit may further include an imaging optical system for forming on a surface to be scanned an image of a light beam that is deflectively scanned by the light deflector.

The imaging optical system may include one or more scanning lenses for forming an image of luminous flux at a constant velocity.

In an aspect of one or more embodiments, there is provided an electrophotographic image forming apparatus which includes an image receptor, a light scanner to form an electrostatic latent image by scanning a light beam onto a surface to be scanned of the image receptor, and a developer to develop the electrostatic latent image formed on the image receptor by supplying toner to the electrostatic latent image, wherein the light scanner includes a light source to emit a light beam according to an image signal, a light deflector to deflectively scan the light beam that is emitted by the light source, a housing having a side portion where the light source is provided and a base surface on which the light deflector is provided and a deformation prevention member to connect opposite sides of the housing across an upper side of the base surface.

In an aspect of one or more embodiments, there is provided a laser scanner which includes a housing having a first sidewall, which is configured to receive a light source, and a second sidewall arranged to face the first sidewall; and a deformation prevention member to connect the first side wall to the second sidewall, wherein the deformation prevention member is formed of a material having a thermal expansion coefficient that is lower than that of a material of the housing.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
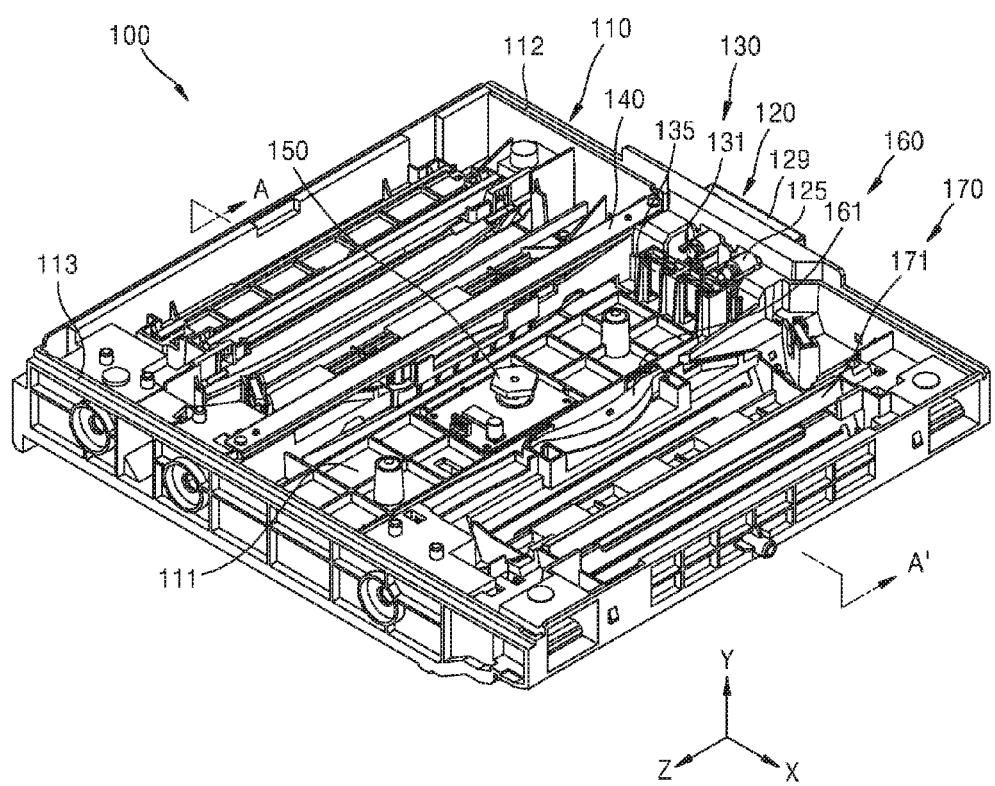
FIG. 1 is a perspective view of a light scanning unit according to an embodiment, viewed from the top thereof.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in the present specification are used for explaining a specific exemplary embodiment, not for limiting the present disclosure. Thus, the expression of singularity in the present specification includes the expression of plurality unless clearly specified otherwise in context. Also, the terms such as "comprise" and/or "comprising" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Embodiments will now be described more fully with reference to the accompanying drawings, in which exemplary embodiments are shown. Throughout the drawings, like reference numerals denote like elements. In the following description, when detailed descriptions about related well-known functions or structures are determined to make the gist unclear, the detailed descriptions will be omitted herein.

Figure 2:
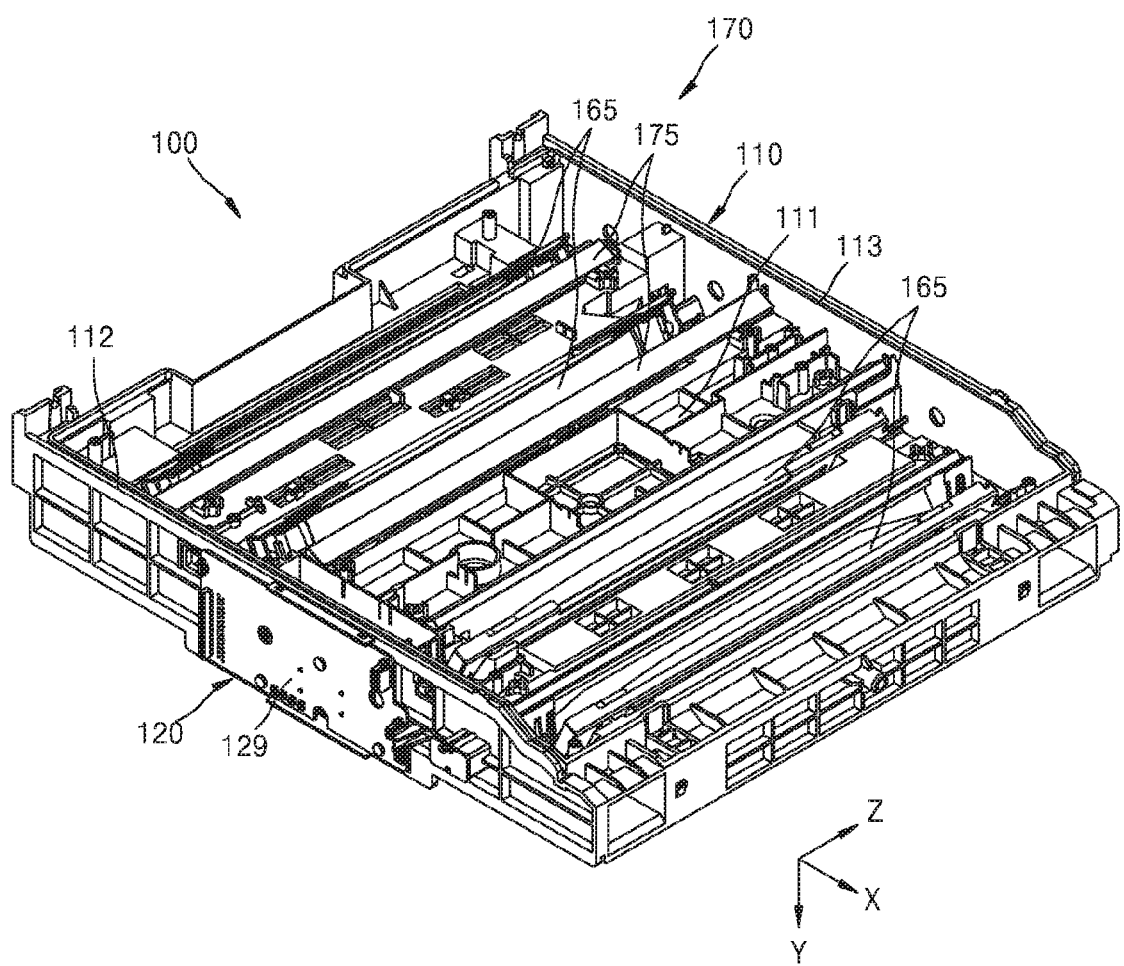
FIG. 2 is a perspective view of the light scanning unit of FIG. 1, viewed from the bottom thereof.
Figure 3:
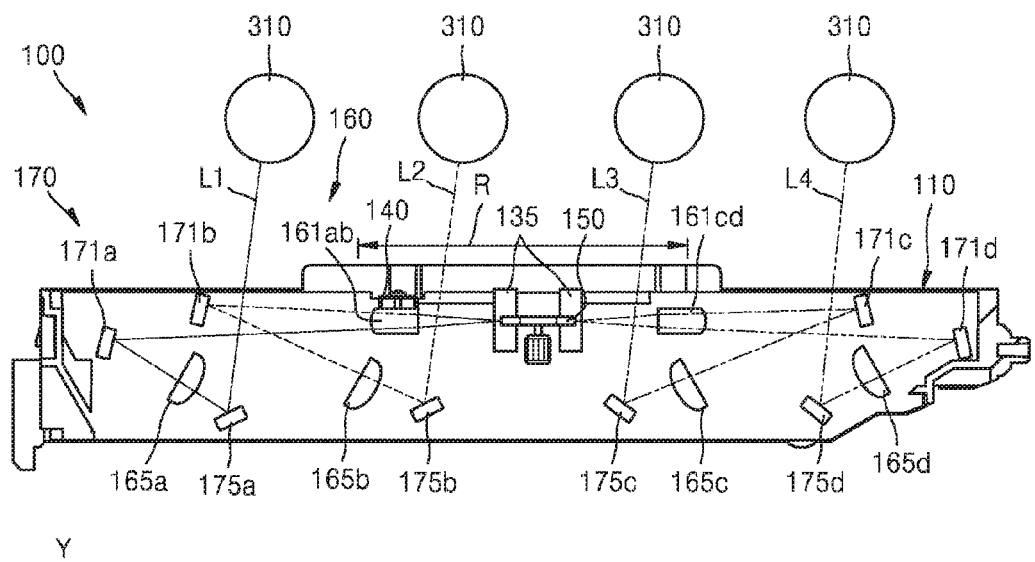
FIG. 3 is a cross-sectional view of the light scanning unit of FIG. 1 taken along a line A-A'.

FIG. 1 is a perspective view of a light scanning unit 100 according to an embodiment, viewed from the top thereof. FIG. 2 is a perspective view of the light scanning unit 100 of FIG. 1, viewed from the bottom thereof. FIG. 3 is a cross-sectional view of the light scanning unit 100 of FIG. 1 taken along a line A-A'.

Referring to FIGS. 1 to 3, the light scanning unit (light scanner) 100 according to an embodiment includes a housing 110, a light source unit (light source) 120 and a light deflector 150 mounted in the housing 110, a deformation prevention member 140 provided across the upper portion of the housing 110. The housing 110 may be a mold structure formed of plastic resin. The housing 110 may include a base surface 111 and first and second side walls 112 and 113 surrounding the base surface 111.

Figure 4:
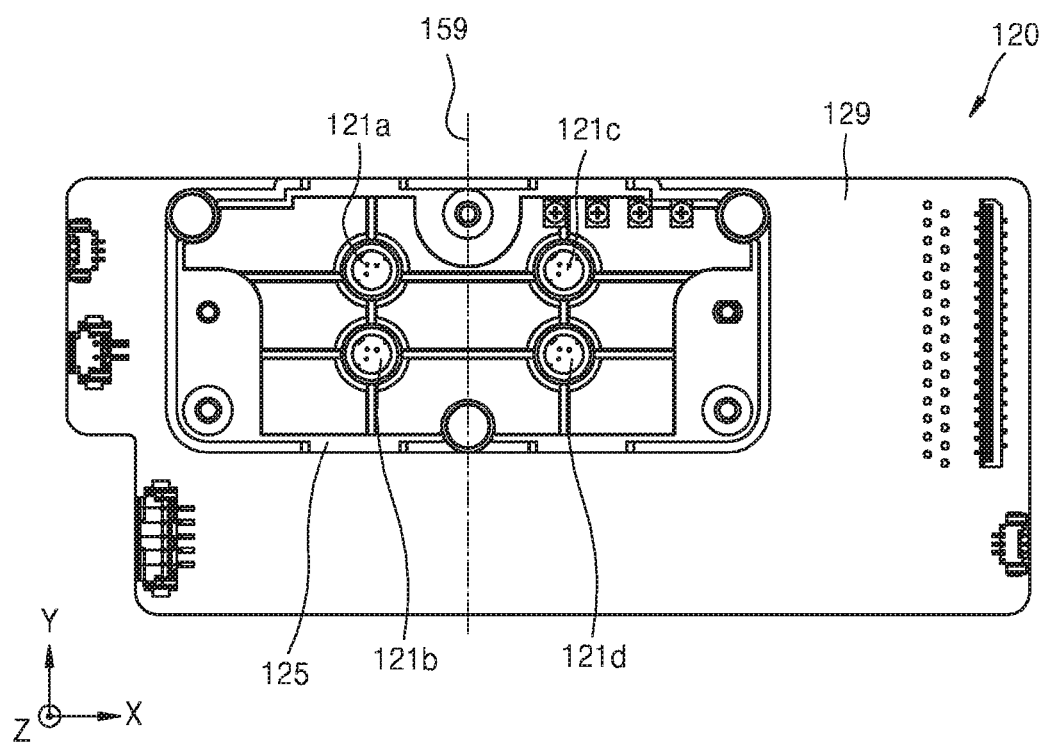
FIG. 4 is a plan view illustrating a light source unit of the light scanning unit of FIG. 1.
Figure 5:
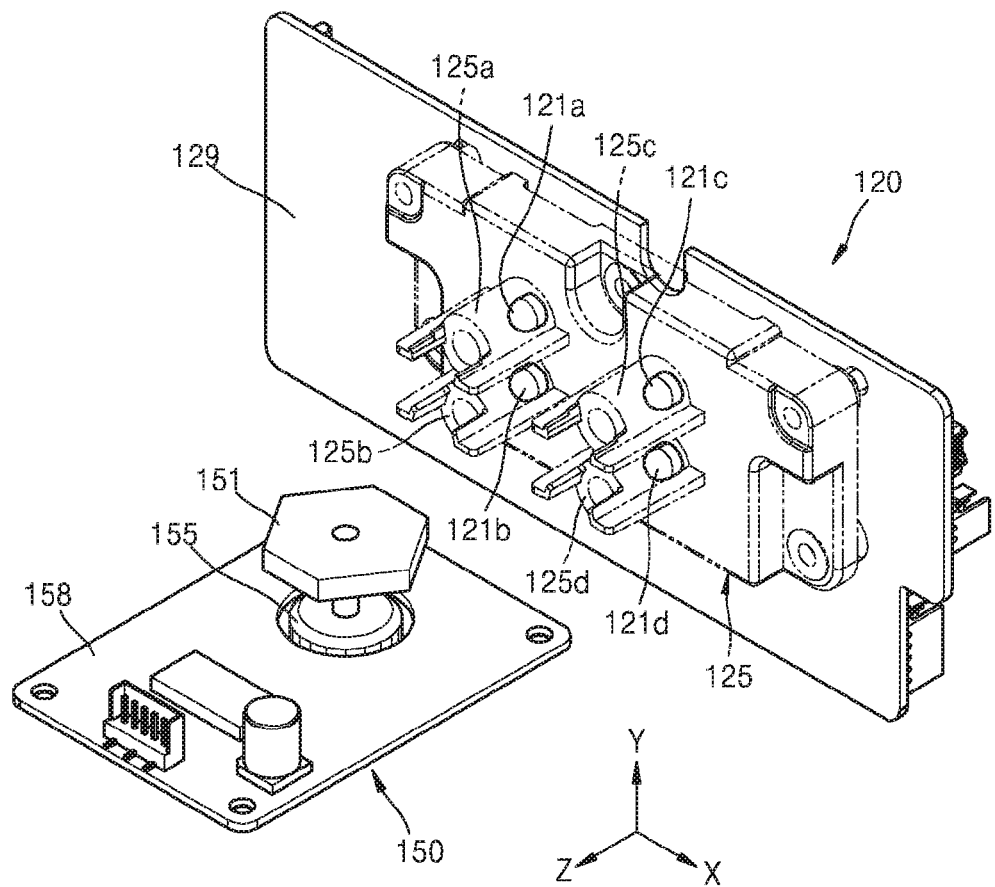
FIG. 5 is a perspective view for explaining the arrangement of a light deflector and a light source unit.

FIG. 4 is a plan view illustrating the light source unit 120 of the light scanning unit 100 of FIG. 1. FIG. 5 is a perspective view for explaining the arrangement of the light deflector 150 with respect to the light source unit 120. Referring to FIG. 4, the light source unit 120 includes first to fourth light sources 121a, 121b, 121c, and 121d and a light source holder 125 for fixing the first to fourth light sources 121a, 121b, 121c, and 121d on the housing 110. The first to fourth light sources 121a, 121b, 121c, and 121d may be laser diodes. The first to fourth light sources 121a, 121b, 121c, and 121d respectively emit first to fourth light beams L1, L2, L3, and L4 that are modulated according to image signals corresponding to image information about, for example, black (K), magenta (M), yellow (Y), and cyan (C) colors.

In the light scanning unit 100 according to an embodiment, the first to fourth light beams L1, L2, L3, and L4 travel toward the same side of the light deflector 150, as will be described later with reference to FIG. 7. The first to fourth light sources 121a, 121b, 121c, and 121d may be provided at the same side wall (hereinafter, referred to as the first side wall) 112 of the housing 110. Also, since the light scanning unit 100 according to an embodiment adopts an oblique optical system as will be described later, the first to fourth light sources 121a, 121b, 121c, and 121d may be densely arranged in a 2×2 matrix. Accordingly, the light holder 125 may be integrally formed with respect to the first to fourth light sources 121a, 121b, 121c, and 121d. In other words, four fixed holes 125a, 125b, 125c, and 125d are provided in the light source holder 125 so that the first to fourth light sources 121a, 121b, 121c, and 121d may be inserted in the fixed holes 125a, 125b, 125c, and 125d from the rear surface of the light source holder 125. As illustrated in FIG. 5, viewed from the front surface of the light source holder 125, the fixed holes 125a, 125b, 125c, and 125d, and correspondingly, the first to fourth light sources 121a, 121b, 121c, and 121d, may be arranged symmetrically to the left and right in pairs with respect to a rotational shaft 159 of the light deflector 150. In other words, the first and second light sources 121a and 121b and the third and fourth light sources 121c and 121d are symmetrically arranged with respect to the rotational shaft 159 of the light deflector 150 in a main scanning direction (direction X). The first and second light sources 121a and 121b may be arranged in parallel in a sub-scanning direction (direction Y) and the third and fourth light sources 121c and 121d may also be arranged in parallel in the sub-scanning direction (direction Y). The light source holder 125 and the first side wall 112 of the housing 110 may be integrally formed of a plastic resin mold. The light source holder 125 may be manufactured separate from the housing 110 and attached to the housing 110. The light source unit 120 may further include a circuit board 129 where the first to fourth light sources 121a, 121b, 121c, and 121d are mounted.

The first to fourth light beams L1, L2, L3, and L4 respectively emitted by the first to fourth light sources 121a, 121b, 121c, and 121d are deflectively scanned by a single light deflector that is the light deflector 150. The light deflector 150 may include, for example, a rotating multi-facet mirror 151 having a plurality of reflection surfaces, that is, deflection surfaces, rotating around a rotation shaft, and a drive motor 155 for rotating the rotating multi-facet mirror 151. The light deflector 150 may be mounted on a board 158 and the board 158 may be installed at an approximately center portion of the base surface 111. Another example of the light deflector 150 may be a microelectromechanical system (MEMS).

Figure 6:
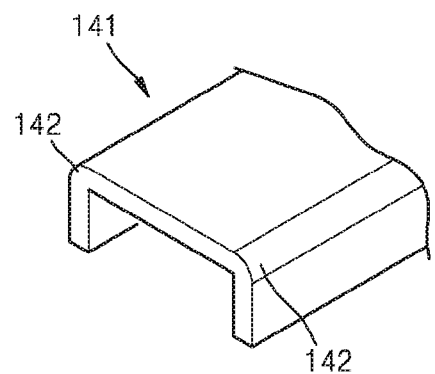
FIG. 6 is a perspective view of a deformation prevention member used for the light scanning unit of FIG. 1.

FIG. 6 is a perspective view of the deformation prevention member 140 used for the light scanning unit 100 of FIG. 1. Referring to FIGS. 1 and 6, the light scanning unit 110 of an embodiment further includes the deformation prevention member 140 that connects the first and second side walls 112 and 113 of the housing 110 across above the base surface 111 of the housing 110. A portion of the deformation prevention member 140 connected to the first side wall 112 may be an area where the light source unit 120 is provided or an area adjacent to the light source unit 120 (area R of FIG. 3). The second side wall 113 may be a side wall corresponding to the first side wall 112 with the light deflector 150 interposed therebetween. In this case, the deformation prevention member 140 may cross the upper side of the light deflector 150 or an area adjacent to the upper side of the light deflector 150.

In the light scanning unit 100, the first to fourth light sources 121a, 121b, 121c, and 121d of the light source unit 120 or the drive motor of the light deflector 150 generate heat during operation. The light scanning unit 100 may be sealed to prevent a malfunction due to dust scattering in the image forming apparatus. Accordingly, the housing 110 may be thermally deformed by the heat generated by the light source unit 120 and the light deflector 150 mounted in the housing 110 or by the surrounding environment. As described later, the thermal deformation of the housing 110 may be restricted by the deformation prevention member 140.

The deformation prevention member 140 may be formed of a material having a thermal expansion coefficient less than that of the housing 110. For example, the deformation prevention member 140 may be formed of metal or plastic resin. The deformation prevention member 140 has an elongated bar structure 141 having opposite ends that are fixed to the first and second side walls 112 and 113 of the housing 110 at four points by using coupling units (couplers) such as screws. The deformation prevention member 140 may be disposed to be higher than a height at which the first to fourth light sources 121a, 121b, 121c, and 121d of the light source unit 120 are provided, with respect to the base surface 111 of the housing 110. The deformation prevention member 140 may have a strength reinforcement structure. The strength reinforcement structure is used to reinforce the strength of the deformation prevention member 140 against the thermal deformation of the housing 110 and may adopt a well-known structure. For example, the strength reinforcement structure may be a structure having a bent portion 142 formed on a cross-sectional surface of the elongated bar structure 141, as illustrated in FIG. 6. In another embodiment, the strength reinforced structure may be a rib provided on a surface of the elongated bar structure 141 of the deformation prevention member 140, an embossment formed on a surface of the elongated bar structure 141 of the deformation prevention member 140, or a combination thereof.

Although the light scanning unit 100 according to an embodiment is described such that the deformation prevention member 140 is arranged in an area where the light source unit 120 is provided or an area adjacent thereto (area R), to be deviated to one side, the deformation prevention member 140 may be arranged directly above the light deflector 150. Also, although the light scanning unit 100 according to an embodiment is described to include only one deformation prevention member 140, a plurality of deformation prevention members 140 may be provided in the area where the light source unit 120 is provided or the area adjacent thereto (area R). It is not excluded that the deformation prevention member 140 may be additionally provided outside the area where the light source unit 120 is provided or the area adjacent thereto (area R).

Figure 7:
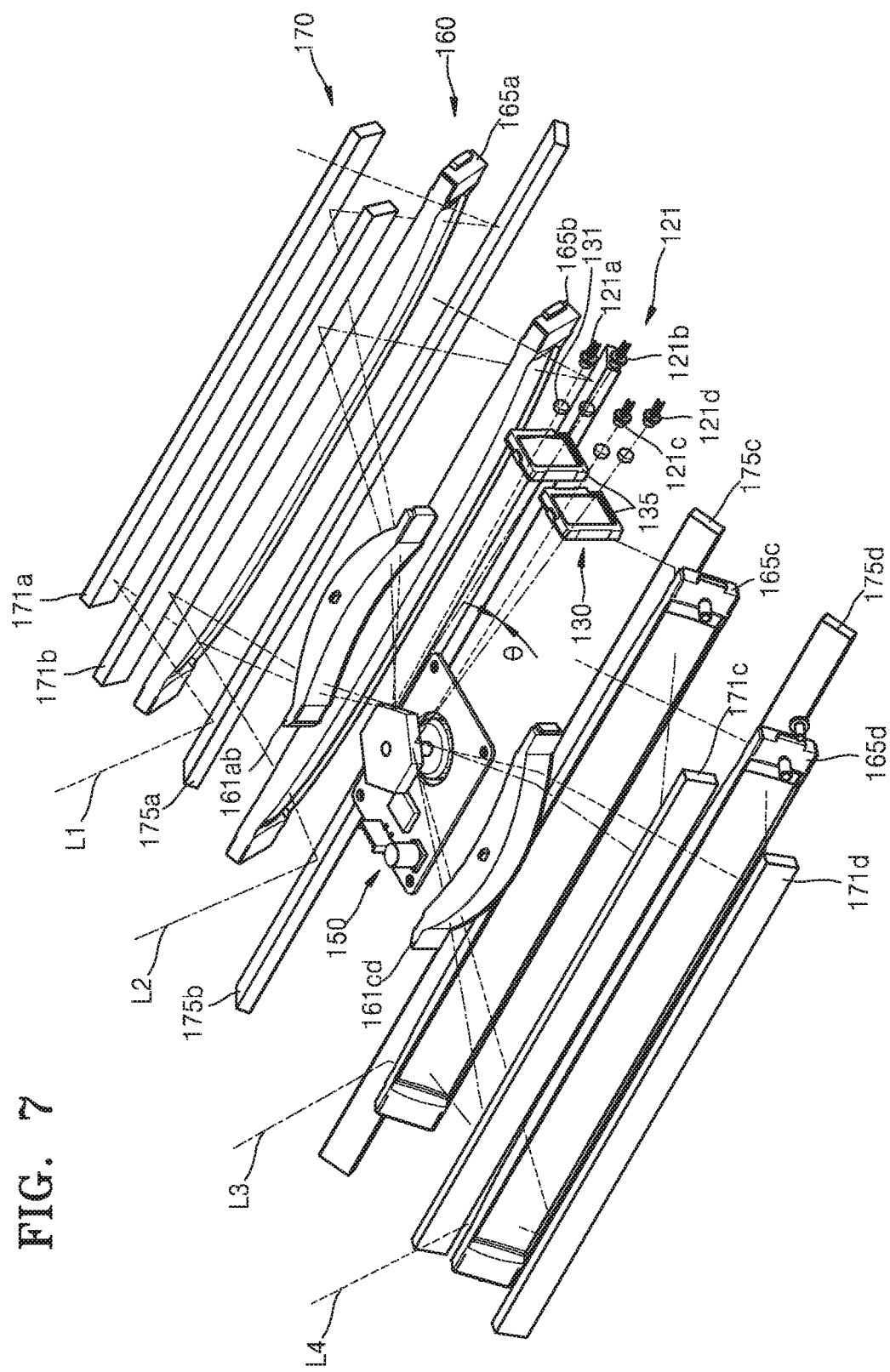
FIG. 7 illustrates an optical configuration of the light scanning unit of FIG. 1.

FIG. 7 illustrates an optical configuration of the light scanning unit of FIG. 1. An optical system of the light scanning unit 100 according to an embodiment is described below with reference to FIG. 7.

An incident optical system 130 may be provided on an optical path between the first to fourth light sources 121a, 121b, 121c, and 121d and the light deflector 150. The incident optical system 130 may include a plurality of collimator lenses 131 and a plurality of cylindrical lenses 135 provided on an optical path of each of the first to fourth light beams L1, L2, L3, and L4. The collimator lenses 131 are focusing lenses that make the first to fourth light beams L1, L2, L3, and L4 respectively emitted by the first to fourth light sources 121a, 121b, 121c, and 121d parallel light beams or convergent light beams. As illustrated in FIG. 5, the collimator lenses 131 are arranged in front of the fixed holes 125a, 125b, 125c, and 125d of the light source holder 125. A lens holder of the collimator lenses 131 may be integrally formed with the light source holder 125. The cylindrical lenses 135 are anamorphic lenses that focus the first to fourth light beams L1, L2, L3, and L4 in a direction corresponding to the sub-scanning direction (direction Y) to form images of the first to fourth light beams L1, L2, L3, and L4 almost linearly on a deflection surface of the light deflector 150.

As illustrated in FIGS. 4 and 5, since the first and second light sources 121a and 12b are arranged close to each other in the sub-scanning direction (direction Y) and the third and fourth light sources 121 c and 12d are arranged close to each other in the sub-scanning direction (direction Y), one cylindrical lens 135 may be commonly used with respect to the first and second light beams L1 and L2 and the other cylindrical lens 135 may be commonly used with respect to the third and fourth light beams L3 and L4. The cylindrical lenses 135 may be separately provided for each of the first to fourth light beams L1, L2, L3, and L4. In some cases, the collimator lenses 131 and the cylindrical lenses 135 may be functionally replaced with one optical part for each optical path. An aperture stop (not shown) may be further provided on an optical path of each of the first to fourth light beams L1, L2, L3, and L4. The aperture stop shapes a section of a luminous flux, that is, the diameter and the shape, of each of the first to fourth light beams L1, L2, L3, and L4.

The incident optical system 130 may be arranged such that the first to fourth light beams L1, L2, L3, and L4 emitted by the first to fourth light sources 121a, 121b, 121c, and 121d are obliquely incident with respect to deflection surfaces of the light deflector 150. For example, the first light source 121 a is disposed above the second light source 121 b in the sub-scanning direction (direction Y) so that the first light beam L1 may be obliquely incident on one deflection surface of the light deflector 150 at an incident angle θ with respect to the normal direction of the deflection surface, and the second light source 121 b is disposed under the first light source 121 a in the sub-scanning direction (direction Y) so that the second light beam L2 may be obliquely incident on the same deflection surface of the light deflector 150 at the incident angle θ with respect to the normal direction of the deflection surface. Similarly, the third light source 121c is disposed above the fourth light source 121d in the sub-scanning direction (direction Y) so that the third light beam L3 may be obliquely incident on other deflection surface of the light deflector 150 at an incident angle θ with respect to the normal direction of the other deflection surface, and the fourth light source 121d is disposed under the third light source 121c in the sub-scanning direction (direction Y) so that the fourth light beam L4 may be obliquely incident on the other deflection surface of the light deflector 150 at the incident angle θ with respect to the normal direction of the other deflection surface. The incident angle θ of the first to fourth light beams L1, L2, L3, and L4 may be set within a range of, for example, about 2° to 4°. As the incident optical system is designed as an oblique optical system, the cylindrical lenses 135 that are described above or first scanning lenses 161ab and 161cd that will be described later are commonly used so that the number of optical parts may be reduced and thus costs for materials may be reduced and the light scanning unit 100 may be made compact.

An imaging optical system 160 may be provided on an optical path between the light deflector 150 and first to fourth photosensitive drums 310. The imaging optical system 160 forms images of the first to fourth light beams L1, L2, L3, and L4 deflectively scanned by the light deflector 150 on each of outer circumferential surfaces, that is, surfaces to be scanned, of the first to fourth photosensitive drums 310.

The imaging optical system 160 may include lenses having an fθ characteristic of correcting the first to fourth light beams L1, L2, L3, and L4 and scanned at a constant velocity onto the first to fourth photosensitive drums 310. In an example, the imaging optical system 160 may include the first scanning lenses 161ab and 161cd and second scanning lenses 165a, 165b, 165c, and 165d, which are provided on an optical path of each of the first to fourth light beams L1, L2, L3, and L4. The first scanning lenses 161ab and 161cd may be designed to have refractive powers of almost zero (0) in the sub-scanning direction, whereas the second scanning lenses 165a, 165b, 165c, and 165d may be designed to have desired refractive powers in the sub-scanning direction. The second scanning lenses 165a, 165b, 165c, and 165d closest to the surface to be scanned may be eccentrically arranged such that a light beam may deflectively pass in the sub-scanning direction with respect to the apex of the lens.

The first scanning lens 161ab may be commonly used for the first and second light beams L1 and L2 that are deflectively scanned and parallelly separated from each other in the sub-scanning direction. The other first scanning lens 161cd may be commonly used for the third and fourth light beams L3 and L4 that are deflectively scanned and parallelly separated from each other in the sub-scanning direction. As such, as the first scanning lenses 161 an and 161 cd are commonly used, the number of optical parts may be reduced and thus the light scanning unit 100 may be made compact.

A first scanning lens may be independently provided for each of the first to fourth light beams L1, L2, L3, and L4. Also, although the imaging optical system 100 includes two scanning lenses for each optical path in an embodiment, one scanning lens or three or more scanning lenses may be provided for each optical path.

An optical path change member 170 may be provided on the optical paths of the first to fourth light beams L1, L2, L3, and L4. For example, the optical path change member 170 may include first reflection mirrors 171a, 171b, 171c, and 171d arranged between the first scanning lenses 161ab and 161cd and the second scanning lenses 165a, 165b, 165c, and 165d and second reflection mirrors 175a, 175b, 175c, and 175d arranged after the second scanning lenses 165a, 165b, 165c, and 165d. The optical path change member 170 may fold the optical paths of the first to fourth light beams L1, L2, L3, and L4 so that the light scanning unit 100 is compacted.

A sync detection optical system (not shown) for detecting sync signals of the first to fourth light beams L1, L2, L3, and L4 that are deflectively scanned by the light deflector 150 may be provided. Next, the function of the deformation prevention member 140 in the light scanning unit 100 according to an embodiment will be described below in comparison with a light scanning unit 100' according to a comparative example.

Figure 8:
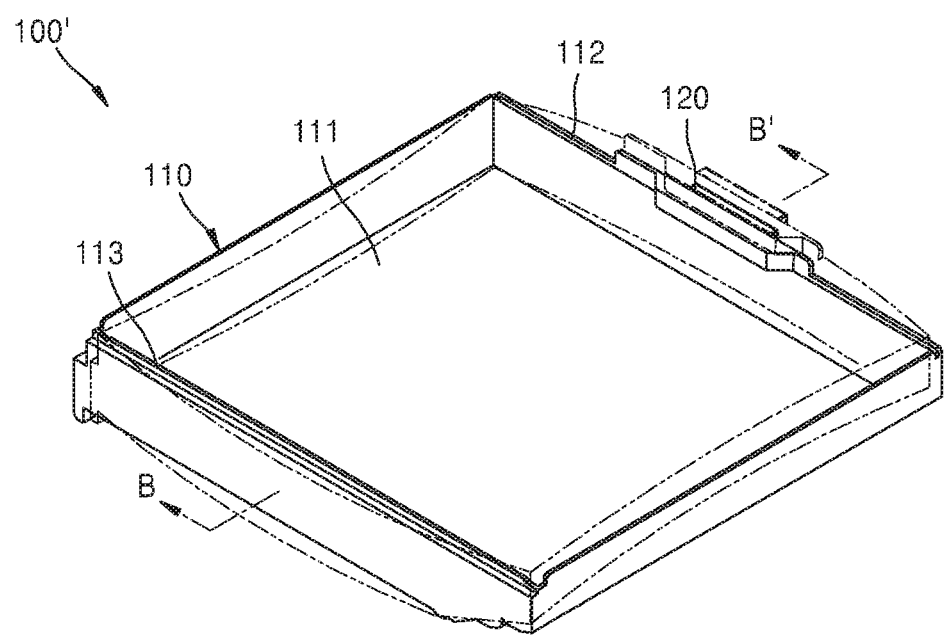
FIG. 8 is a schematic view for explaining thermal deformation of a light scanning unit according to a comparative example.
Figure 9:
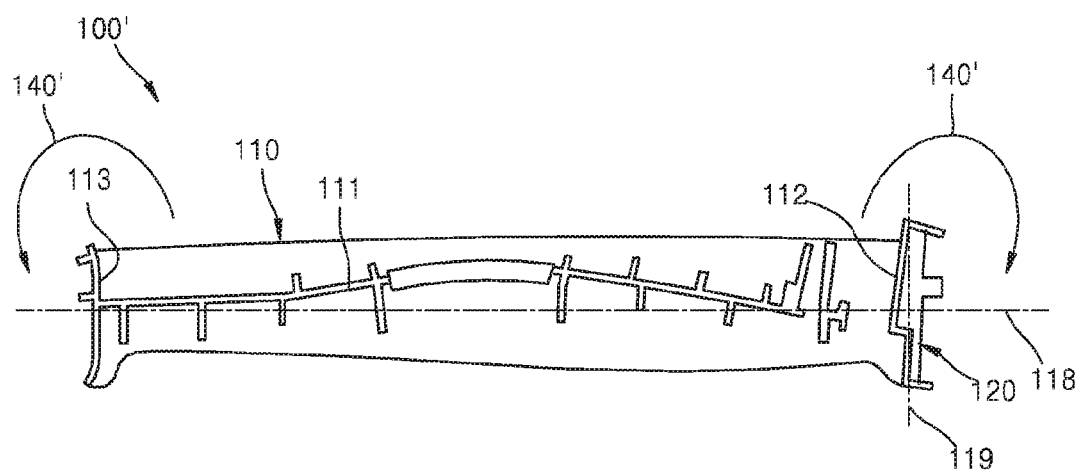
FIG. 9 is a cross-sectional view for explaining thermal deformation of the light scanning unit of FIG. 8.
Figure 10:
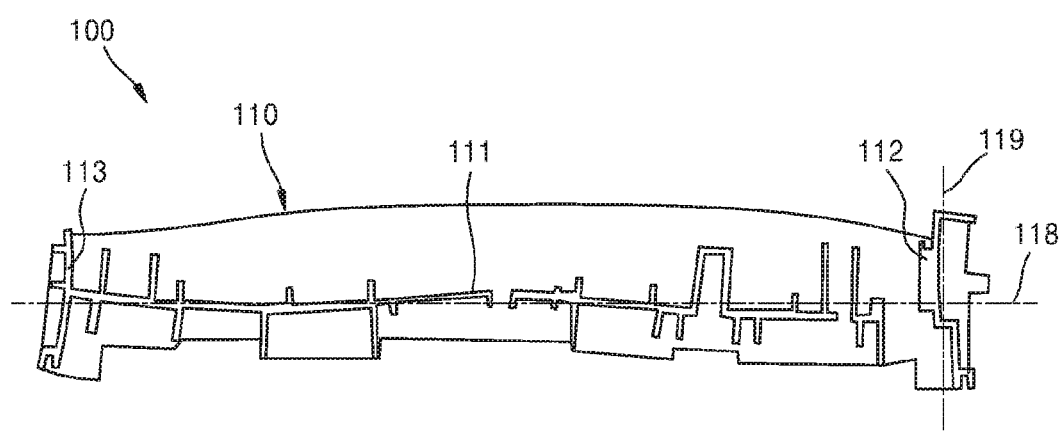
FIG. 10 is a schematic view for explaining thermal deformation of the light scanning unit of FIG. 1.

FIG. 8 is a schematic view for explaining thermal deformation of the light scanning unit 100' according to a comparative example. FIG. 9 is a cross-sectional view for explaining thermal deformation of the light scanning unit 100' of FIG. 8. FIG. 10 is a schematic view for explaining thermal deformation of the light scanning unit 100 of FIG. 1.

Referring to FIGS. 8 and 9, a structure of the light scanning unit 100' according to the comparative example is substantially the same as that of the light scanning unit 100 of an embodiment, except that the deformation prevention member 140 is not provided.

Referring to FIGS. 8 and 9, the heat generated during the operation of the light scanning unit 100' according to the comparative example mainly concentrates on the light source unit 120 and other heat is generated by the light deflector 150. Due to the heat, bending 140' is generated such that a center portion of the base surface 111 of the housing 110 is bent upwardly compared to a reference base surface 118, that is, a base surface before thermal deformation, and the first and second side walls 112 and 113 are bent outwardly with respect to reference side walls 119, that is, side walls before thermal deformation. As a result of the above thermal deformation, since the first to fourth light sources 121a, 121b, 121c, and 121d are densely arranged in a matrix of 2×2, the first to fourth light sources 121a, 121b, 121c, and 121d are oblique in the same direction. Since optical paths of the first and second light beams L1 and L2 scanned by the first and second light sources 121a and 121b disposed at the left side with respect to the rotational shaft 159 of the light deflector 150 and optical paths of the third and fourth light beams L3 and L4 scanned by the third and fourth light sources 121c and 121d disposed at the right side with respect to the rotational shaft 159 of the light deflector 150 are different to each other, a tendency of a change of the imaging positions of the first and second light beams L1 and L2 due to the thermal deformation and that of the third and fourth light beams L3 and L4 due to the thermal deformation appear to be opposite, as will be described later with reference to FIG. 11A and FIG. 11B.

Referring to FIG. 10, the light scanning unit 100 according to an embodiment employing the deformation prevention member 140 disposed across the upper portion of the housing 110 may reduce thermal deformation of the housing 110. In other words, as illustrated in FIGS. 8 and 9, when the deformation prevention member 140 does not exist, the bending 140' of the housing 110 due to thermal deformation is generated such that the center portion of the base surface 111 is bent upwardly with respect to the reference surface, that is, a surface before thermal deformation, and the first and second side walls 112 and 113 are bent outwardly. Accordingly, as illustrated in FIGS. 8 and 9, as the deformation prevention member 140 is provided across the upper portion of the housing 110, connecting the area of the first side wall 112 where the light source unit 120 is provided and having the most thermal stress or the area adjacent to the light source unit 120 (area R) and the second side wall 113 opposite thereto, the bending 140' of the housing 110 may be reduced.

Figure 11A:
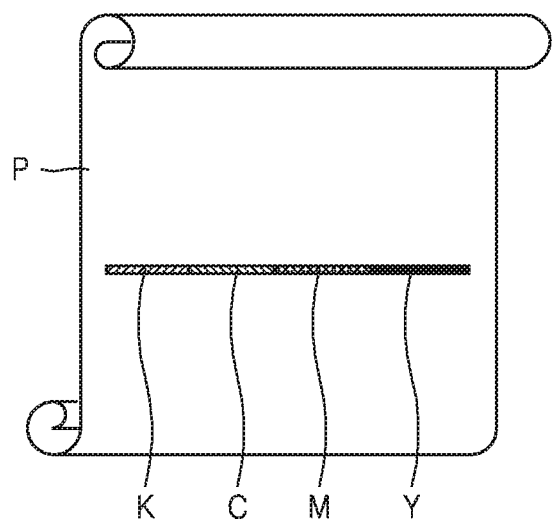
FIG. 11A and FIG. 11B are views for explaining a color registration error according to thermal deformation of a light scanning unit.
Figure 11B:
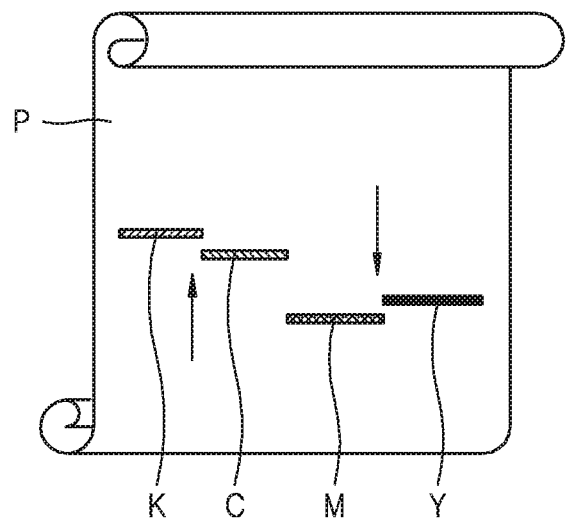
Figure 12:
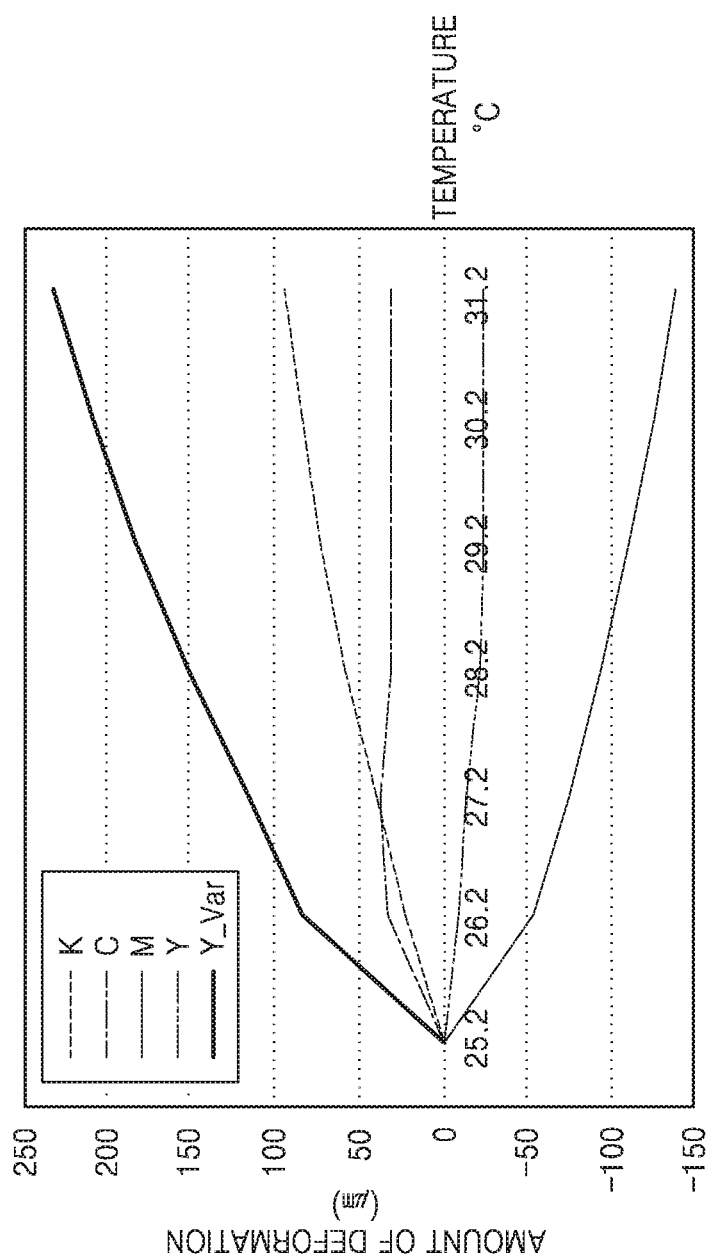
FIG. 12 is a graph for showing thermal deformation according to a temperature of the light scanning unit of FIG. 8.
Figure 13:
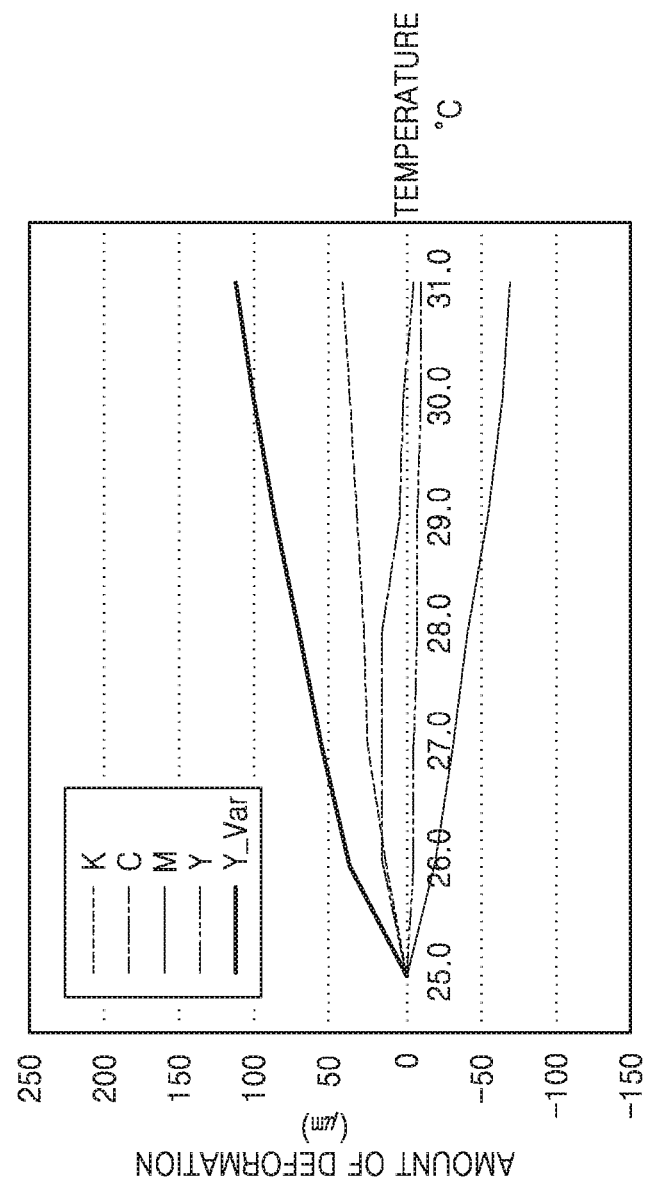
FIG. 13 is a graph for showing thermal deformation according to a temperature of the light scanning unit of FIG. 1.

FIG. 11A and FIG. 11B are views for explaining a color registration error according to thermal deformation of a light scanning unit. FIG. 12 is a graph for showing thermal deformation according to a temperature of the light scanning unit 100' of FIG. 8. FIG. 13 is a graph for showing thermal deformation according to a temperature of the light scanning unit 100 of FIG. 1.

Referring to FIG. 11A, when there is no color registration, four light beams corresponding to the black (K), magenta (M), yellow (Y), and cyan (C) colors are scanned at accurate positions. However, as described with reference to FIGS. 8 and 9, the bending 140' due to thermal deformation causes disarrangement of the optical parts including the light source unit 120 and thus, as illustrated in FIG. 11B, the four light beams corresponding to the black (K), magenta (M), yellow (Y), and cyan (C) colors is scanned incorrectly onto the surface to be scanned. Accordingly, the quality of a color image formed on a print medium P as above is deteriorated.

A relatively large amount of deterioration of the image quality due to a color registration error is generated as the temperature gradually increases in the light scanning unit 100' according to a comparative example, as illustrated in FIG. 12. In contrast, in the light scanning unit 100 according to an embodiment, relatively less deterioration of the image quality due to a color registration error is generated, even though the temperature gradually increases. For example, in FIGS. 12 and 13, a thick solid line Y_Var denotes a sum of errors with respect to the black (K), magenta (M), yellow (Y), and cyan (C) colors. When the temperature increases by 6° from the room temperature of 25° in a state in which no color registration exists, the amount of deformation in the light scanning unit 100' according to a comparative example is about 230 μm, whereas the amount of deformation in the light scanning unit 100 according to an embodiment is about 110 μm. Accordingly, it can be seen that the deformation prevention member 140 may reduce the color registration error due to thermal deformation to be less than or equal to 50%.

Figure 14:
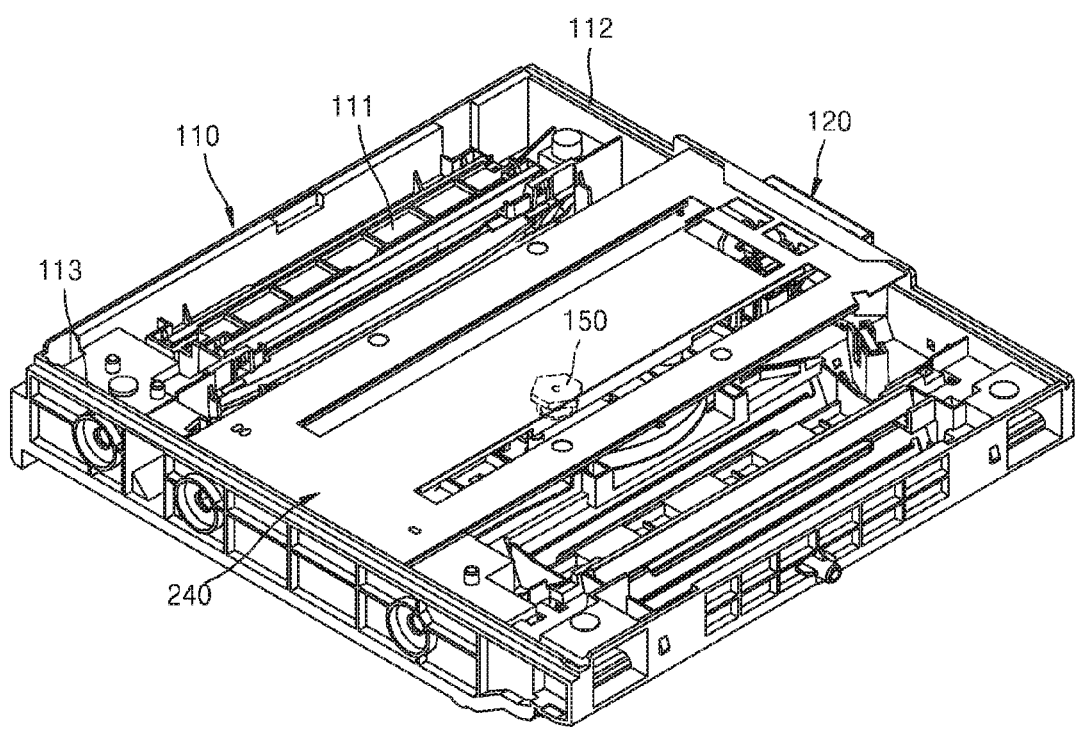
FIG. 14 is a perspective view of a light scanning unit according to an embodiment where a cover is removed, viewed from the top thereof.
Figure 15:
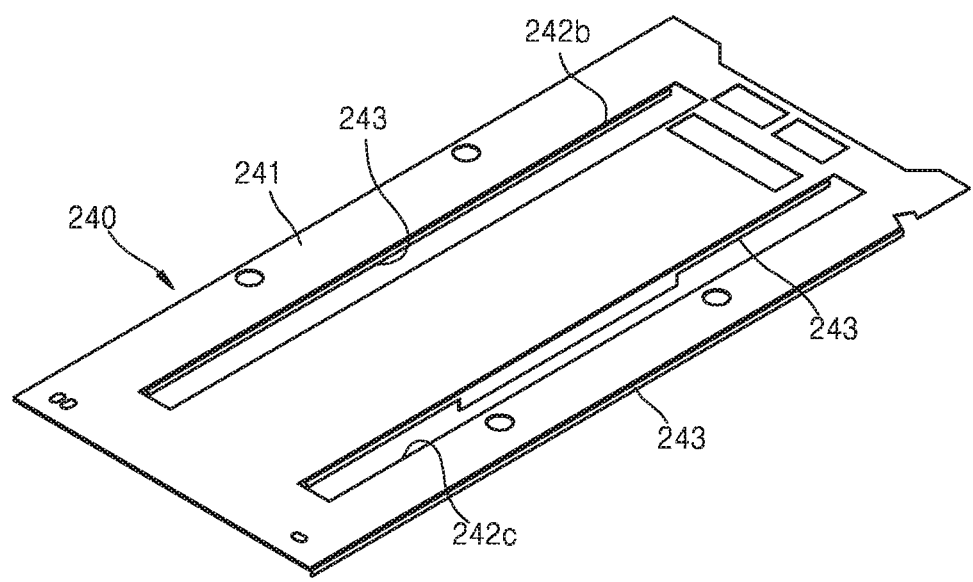
FIG. 15 illustrates a deformation prevention member used for the light scanning unit of FIG. 14.

FIG. 14 is a perspective view of a light scanning unit 200 according to an embodiment, where a cover is removed, viewed from the top thereof. FIG. 15 illustrates a deformation prevention member 240 used for the light scanning unit 200 of FIG. 14. Since the constituent elements of the light scanning unit 200 according to an embodiment are substantially the same as those of the above-described light scanning unit 100 except for the deformation prevention member 240, the following description will focus on differences between the light scanning unit 200 according to an embodiment and the light scanning unit 100 according to an embodiment.

Referring to FIGS. 14 and 15, the deformation prevention member 240 may have a form of a plate 241 having a large width. As in the above-described embodiment, the deformation prevention member 240 may connect the first side wall 112 on which the light source unit 120 is provided and the second side wall 113 corresponding to the first side wall 112 with the light deflector 150 interposed therebetween. In other words, opposite ends of the deformation prevention member 240 may be fixed to the first and second side walls 112 and 113 at four points by using a coupling unit (not shown) such as a screw. Furthermore, since the deformation prevention member 240 according to an embodiment has the plate 241 having a large width, one side of the deformation prevention member 240 may cover all the area of the first side wall 112 where the light source unit 120 is provided or the area adjacent to the light source unit 120 (area R). Also, the deformation prevention member 240 may be arranged across the upper side of the light deflector 150. The deformation prevention member 240 may be provided to cover not only the upper side of the light deflector 150 but also an area where the second and third light beams L2 and L3 of FIG. 3 that exit to the outside. In this case, windows 242b and 242c may be provided in the deformation prevention member 240 so that the second and third light beams L2 and L3 may exit to the outside.

As in the above-described embodiment, the deformation prevention member 240 may have a strength reinforcement structure 243. For example, the strength reinforcement structure may be a structure having a bent portion 243 formed on a cross-sectional surface of the plate 241 as illustrated in FIG. 15, a rib provided on a surface of the plate 241, an embossment formed on a surface of the plate 241, or a combination thereof.

Figure 16:
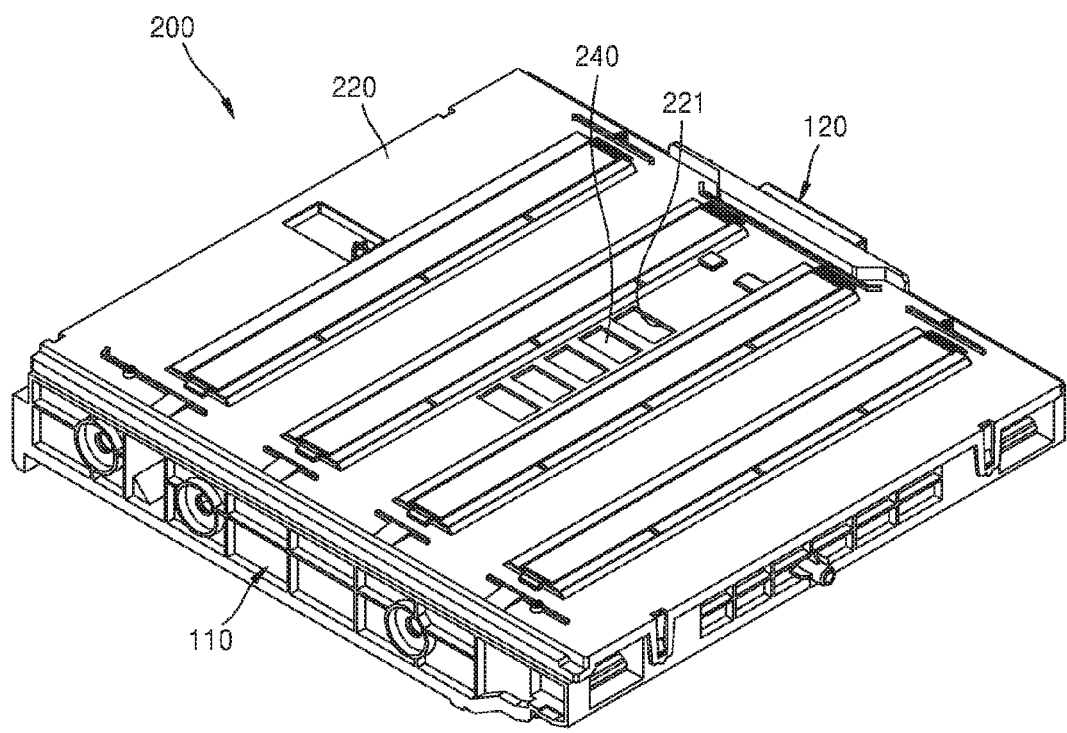
FIG. 16 is a perspective view of the light scanning unit of FIG. 14, where the cover is closed, viewed from the top thereof.

FIG. 16 is a perspective view of the light scanning unit 200 of FIG. 14, where the cover is closed, viewed from the top thereof. Referring to FIG. 16, the upper portion of the housing 110 is closed by the cover 220. A heat radiation hole 221 may be provided at a position adjacent to the deformation prevention member 240, with the windows for exiting the first to fourth light beams L1, L2, L3, and L4 to the outside. The number or shape of the heat radiation hole 221 is not limited to the above example.

Although in the above-described embodiments one light source holder 126 and one circuit board 129 are provided with respect to the light source unit 120 having the first to fourth light sources 121a, 121b, 121c, and 121d, the light source holder 126 and the circuit board 129 may be provided individually or in pairs for each of the first to fourth light sources 121a, 121b, 121c, and 121d.

Although in the above-described embodiments the first and second light sources 121a and 121b and the third and fourth light sources 121c and 121d are arranged together at one side of the light deflector 150, the first and second light sources 121a and 121b and the third and fourth light sources 121c and 121d may be arranged symmetrically with respect to the light deflector 150. In other words, the first and second light sources 121a and 121b may be arranged at the first side wall 112 of the housing 110 and the third and fourth light sources 121c and 121d may be arranged at the second side wall 113 of the housing 110.

Figure 17:
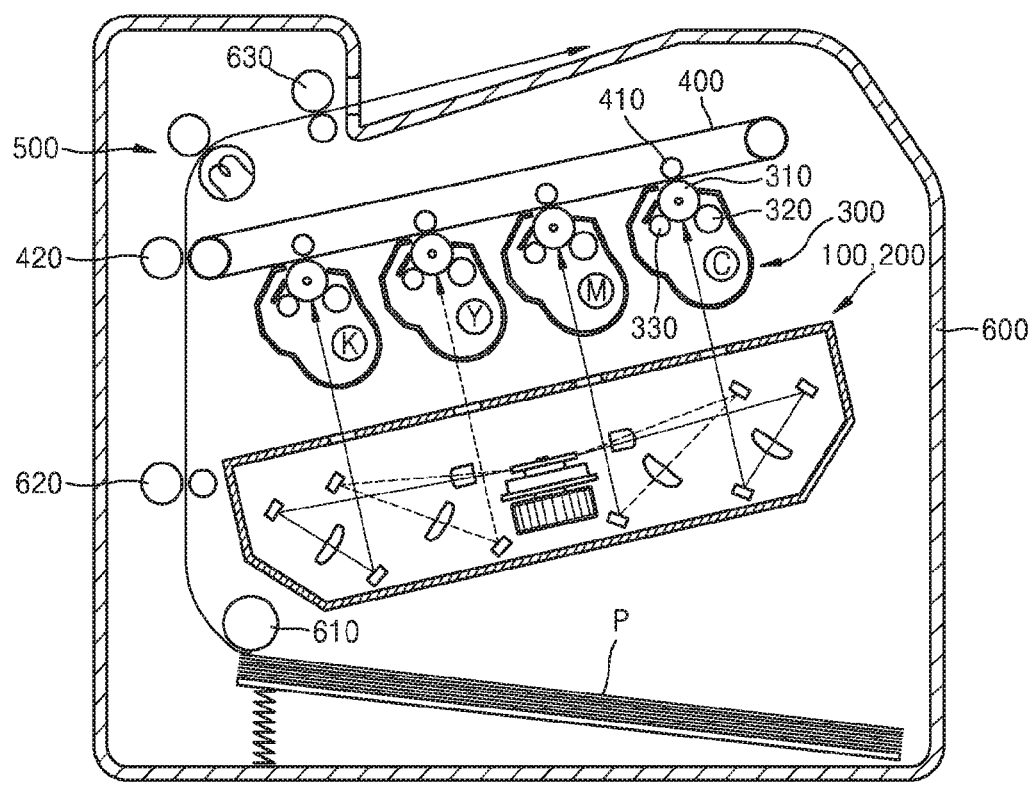
FIG. 17 illustrates a schematic structure of an electrophotographic type image forming apparatus employing a light scanning unit according to an embodiment.

FIG. 17 illustrates a schematic structure of an electrophotographic type image forming apparatus employing a light scanning unit according to an embodiment. The image forming apparatus of FIG. 17 is a dry electrophotographic image forming apparatus that prints a color image by using a dry developer (hereinafter, referred to as toner).

The image forming apparatus according to an embodiment includes the light scanning unit 100 or 200, a developing unit (developer) 300, an intermediate transfer belt 400, first and second transfer rollers 410 and 420, and a fusing unit (fuser) 500, which are accommodated in a cabinet 600.

The light scanning unit 100 or 200 for scanning a plurality of light beams may be one of the light scanning units according to the above-described embodiments of FIGS. 1 to 16. For example, the light scanning unit 100 or 200 may scan four light beams corresponding to the black (K), magenta (M), yellow (Y), and cyan (C) colors.

The developing unit 300 may be provided for each color corresponding to the light beams. For example, one developing unit 300 may be provided for each of the black (K), magenta (M), yellow (Y), and cyan (C) colors. The developing unit 300 includes one of the first to fourth photosensitive drums 310, which is an image receptor where an electrostatic latent image is formed, and a developing roller 320 for developing the electrostatic latent image, for each color.

The photosensitive drum 310 is an example of the image receptor, in which a photosensitive layer is formed on an outer circumferential surface of a cylindrical metal pipe. The outer circumferential surface of the photosensitive drum 310 is a surface to be scanned. The photosensitive drum 310 is exposed to the outside of the developing unit 300 and separated from each other in the sub-scanning direction. A photosensitive belt type image receptor may be employed instead of the photosensitive drum 310.

A charge roller 330 is provided at an upper stream of a region that is exposed to light by the light scanning unit 100 or 200 on the outer circumferential surface of the photosensitive drum 310. The charge roller 330 is an example of a charger that charges a surface of the photosensitive drum 310 to a uniform electric potential while rotating in contact with the outer circumferential surface of the photosensitive drum 310. A charging bias is applied to the charge roller 330. A corona charger (not shown) may be used instead of the charge roller 330. The developing roller 320 having toner adhering to an outer circumferential surface thereof supplies the toner to the photosensitive drum 310. A developing bias to supply the toner to the photosensitive drum 310 is applied to the developing roller 320. Although it is not illustrated in FIG. 17, a supply roller (not shown) adhering the toner accommodated in the developing unit 300 to the developing roller 320, a restriction unit (not shown) restricting an amount of the toner adhering to the developing roller 320, and an agitator (not shown) transferring the toner accommodated therein toward the supply roller and/or developing roller 320 may be further provided in each developing unit 300.

The intermediate transfer belt 400 faces the outer circumferential surface of the photosensitive drum 310 that is exposed to the outside of the developing unit 300. The intermediate transfer belt 400 is an example of an intermediate transfer body that transfers the toner image of the photosensitive drum 310 to a print medium P. An intermediate transfer drum (not shown) may be used as the intermediate transfer body instead of the intermediate transfer belt 400. The intermediate transfer belt 400 circulates in contact with the photosensitive drum 310. The four first transfer rollers 410 are each provided at a position facing each photosensitive drum 310 with the intermediate transfer belt 400 interposed therebetween. A first transfer bias is applied to each of the first transfer rollers 410 so that the toner image of the photosensitive drum 310 may be transferred to the intermediate transfer belt 400.

The second transfer roller 420 is arranged to face the intermediate transfer belt 400 so that the print medium P may pass between the second transfer roller 420 and the intermediate transfer belt 400. A second transfer bias is applied to the second transfer roller 420 so that the toner image of the intermediate transfer belt 400 may be transferred to the print medium P.

A process of forming a color image according to the above-described structure will be described below.

The photosensitive drum 310 of the developing unit 300 is charged to a uniform electric potential by the charge bias applied to the charge roller 330. The light scanning unit 100 or 200 exposes the outer circumferential surface of the photosensitive drum 310 in a lengthwise direction, that is, the main scanning direction. The outer circumferential surface of the photosensitive drum 310 is moved in the sub-scanning direction according to the rotation of the photosensitive drum 310. Accordingly, a two-dimensional electrostatic latent image corresponding to the image information about each of the black (K), magenta (M), yellow (Y), and cyan (C) colors is formed on the outer circumferential surface of each of the four photosensitive drums 310. The sub-scanning direction is perpendicular to the main scanning direction. The four developing units 300 each supply toner of the black (K), magenta (M), yellow (Y), and cyan (C) colors to the photosensitive drums 310 to form toner images of the black (K), magenta (M), yellow (Y), and cyan (C) colors.

The toner images of the black (K), magenta (M), yellow (Y), and cyan (C) colors formed on the photosensitive drums 310 are overlapped with one another on the intermediate transfer belt 400 by the first transfer bias applied to the first transfer roller 410, thereby forming a color toner image.

A medium for finally accommodating toner, for example, the print medium P, is transferred by a pickup roller 610 and a transfer roller 620 and inserted between the intermediate transfer belt 400 and the second transfer roller 420. The color toner image transferred to the intermediate transfer belt 400 is transferred to the print medium P by the second transfer bias applied to the second transfer roller 420. The color toner image transferred to the print medium P is retained on a surface of the print medium P by an electrostatic force. The print medium P to which the color toner image is transferred is sent to the fusing unit 500. The color toner image transferred to the print medium P receives heat and pressure at a fusing nip (not shown) and is fixedly fused on the print medium P. The print medium P having been completely fused is ejected to the outside of the image forming apparatus by an eject roller 630.

The image forming apparatus according to an embodiment is described to form a color image, but the present disclosure is not limited thereto. For example, when a monochromatic image in black and white is to be formed, the light scanning unit 100 or 200 scans a single light beam and the developing unit 320 may be provided only for the single light beam. Furthermore, in the image forming apparatus according to an embodiment, other constituent elements, except for the light scanning unit 100 or 200, that is, the developing unit 300, the intermediate transfer belt 400, the first and second transfer rollers 410 and 420, and the fusing unit 500, are described as an example of a printing unit for transferring a toner image to a print medium by an electrophotographic method. Any well-known printing unit may be employed for the image forming apparatus according to an embodiment. The image forming apparatus may be a laser beam printer, a digital copier, a multifunction printer (MFP), etc.

It should be understood that exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. An electrophotographic image forming apparatus comprising:
    an image receptor;
    a light scanner to form an electrostatic latent image by scanning a light beam onto a surface to be scanned of the image receptor; and
    a developer to develop the electrostatic latent image formed on the image receptor by supplying toner to the electrostatic latent image,
    wherein the light scanner comprises:
    a light source to emit a light beam according to an image signal;
    a light deflector to deflectively scan the light beam that is emitted by the light source;
    a housing having a side portion where the light source is provided and a base surface on which the light deflector is provided; and
    a deformation prevention member to connect opposite sides of the housing across an upper side of the base surface, and
    wherein the deformation prevention member is disposed to be higher than an installation height of the light source.

2. The electrophotographic image forming apparatus of claim 1, wherein the deformation prevention member is formed of a material having a thermal expansion coefficient that is lower than that of a material of the housing.

3. The electrophotographic image forming apparatus of claim 2, wherein the housing is formed of plastic resin and the deformation prevention member is formed of metal or plastic resin.

4. The electrophotographic image forming apparatus of claim 1, wherein the housing has a second side wall arranged facing the first side wall with the light deflector interposed between the first and second side walls, and the deformation prevention member connects the first and second side walls.

5. The electrophotographic image forming apparatus of claim 4, wherein a portion of the deformation prevention member that is connected to the first side wall is an area where the light source is provided or an area adjacent to the area where the light source is provided.

6. The electrophotographic image forming apparatus of claim 1, wherein the deformation prevention member has a form of a long bar or a plate.

7. The electrophotographic image forming apparatus of claim 1, wherein one or a plurality of the deformation prevention members are provided.

8. The electrophotographic image forming apparatus of claim 1, wherein the deformation prevention member has a strength reinforcement structure.

9. The electrophotographic image forming apparatus of claim 1, wherein the strength reinforcement structure comprises at least one of a bent portion on a cross-sectional surface of the deformation prevention member, an embossment formed on a surface of the deformation prevention member, and a rib provided on a surface of the deformation prevention member.

10. The electrophotographic image forming apparatus of claim 1, wherein the housing further comprises a cover disposed above the deformation prevention member and the cover comprises a heat dissipation hole provided adjacent to a position where the deformation prevention member is disposed.

11. The electrophotographic image forming apparatus of claim 1, wherein the light source comprises a plurality of light sources and the plurality of light sources are arranged at one side wall of the housing.

12. The electrophotographic image forming apparatus of claim 11, wherein the light source further comprises an integrated light source holder that fixes the plurality of light sources to the housing.

13. The electrophotographic image forming apparatus of claim 12, wherein the light source holder is integrally formed with the housing.

14. The electrophotographic image forming apparatus of claim 12, wherein the light source further comprises a circuit board where the plurality of light sources are mounted.

15. The electrophotographic image forming apparatus of claim 11, wherein light beams emitted by the plurality of light sources are obliquely incident on the light deflector with respect to a sub-scanning direction.

16. The electrophotographic image forming apparatus of claim 1, wherein the light source comprises first to fourth light sources that emit first to fourth light beams, and the light deflector deflectively scans the first and second light beams on one deflection surface and the third and fourth light beams on a deflection surface that is different from the one deflection surface.

17. The electrophotographic image forming apparatus of claim 1, further comprising an incident optical system that is arranged between the light source and the light deflector.

18. The electrophotographic image forming apparatus of claim 17, wherein the incident optical system comprises at least one of a collimator lens that shapes a light beam emitted by the light source unit into a parallel luminous flux and a cylindrical lens that focuses the light beam, which is emitted by the light source, on a deflection surface of the light deflector in a sub-scanning direction.

19. The electrophotographic image forming apparatus of claim 1, further comprising an imaging optical system for forming on a surface to be scanned an image of a light beam that is deflectively scanned by the light deflector.

20. The electrophotographic image forming apparatus of claim 19, wherein the imaging optical system comprises one or more scanning lenses for forming an image of luminous flux at a constant velocity.

* * * * *